United States Patent [19]

Cox

[11] Patent Number: 5,224,440
[45] Date of Patent: Jul. 6, 1993

[54] CLAMSHELL HINGING AERIAL WIRE MARKER FOR OVERHEAD LINES

[76] Inventor: James A. Cox, Rte. 1 Box 70, Rockville, Va. 23146

[21] Appl. No.: 885,681

[22] Filed: May 19, 1992

[51] Int. Cl.⁵ .............................................. G08B 5/00
[52] U.S. Cl. ............................ 116/209; 116/DIG. 33; 220/4.22; 220/4.25
[58] Field of Search ........................ 116/209, DIG. 33; 29/433, 463, 709, 714; 220/4.21, 4.22, 4.25; 174/42, 135

[56] References Cited

U.S. PATENT DOCUMENTS

| | | | |
|---|---|---|---|
| 1,627,423 | 5/1927 | Bierce | 116/DIG. 33 X |
| 1,764,039 | 8/1929 | Cooper | 220/4.25 X |
| 3,135,236 | 6/1964 | Pfeiffer et al. | 116/209 |
| 3,183,883 | 5/1965 | Ruhlman et al. | 116/209 |
| 3,362,377 | 1/1968 | Hill et al. | 116/209 |
| 3,683,843 | 8/1972 | Schlein | 116/209 |
| 4,474,133 | 10/1984 | Anderson et al. | 116/209 |
| 4,532,722 | 8/1985 | Sax | 220/4.25 X |
| 4,779,794 | 10/1988 | Moore | 220/4.25 X |
| 4,885,835 | 12/1989 | Osgood | 116/DIG. 33 X |

FOREIGN PATENT DOCUMENTS

| | | | |
|---|---|---|---|
| 0701422 | 1/1965 | Canada | 116/209 |
| 2735648 | 2/1979 | Fed. Rep. of Germany | 116/DIG. 33 |
| 0820619 | 8/1937 | France | 116/DIG. 33 |
| 1284766 | 1/1962 | France | 116/DIG. 33 |
| 0694779 | 10/1957 | United Kingdom | 220/4.22 |

*Primary Examiner*—William A. Cuchlinski, Jr.
*Assistant Examiner*—John L. Beres
*Attorney, Agent, or Firm*—Cushman, Darby & Cushman

[57] ABSTRACT

An overhead line marking device that is installable from one end thereof. The marker device is formed from two bodies and when installed includes two identical hinge/retaining assemblies at each end. Each hinge/retaining assembly includes a lower support plate, at least one U-shaped retaining leg member and an extension tongue as part of the upper body. Prior to installation, the far hinge/retaining assembly will be performed by attaching at least one U-shaped leg member onto the support. This forms a retaining groove that can receive and in which the tongue extension can rotate. During installation the tongue extension will be inserted into the far hinge/retaining assembly, after the lower body is secured to the overhead line, and the near hinge/retaining assembly is then completed forming an enclosed marker device about the overhead line.

15 Claims, 6 Drawing Sheets

CLAMSHELL HINGING AERIAL WIRE MARKER FOR OVERHEAD LINES

BACKGROUND OF THE INVENTION

1. Field of the Invention

This invention relates to overhead line marker spheres and to a method of installing such markers on overhead lines.

2. Related Art

Various types of prior art aerial warning marker devices have been previously disclosed.

Williams, U.S. Pat. No. 3,253,571, discloses a helically wound device that can have a plurality of elongated shapes. The device is comprised of a series of coils that are simply rotated on to an aerial line.

Pfeiffer, U.S. Pat. No. 3,135,236, discloses a conically shaped device that is attached to a cable or aerial line by means of a clamp with a spring extending between the hanging on the spring beneath the cable.

Ruhlmen et al, U.S. Pat. No. 3,183,883, discloses a series of spherical segments that include trailing preformed helical wire portions that can be wrapped around a wire. By putting a plurality of these together, a geometrically shaped body can be formed that does not require clamping.

Many of the spherical type devices have required clamps at each end to clamp the sphere halves on to the cable. Such markers are shown in French Patent 1284766, Swiss Patent 579838 and Lematta, U.S. Pat. No. 3,430,325.

Hill et al, U.S. Pat. No. 3,362,377, shows a spring actuated hollow spherical body that is held open an when a pin is released closes about a high power line or other type of overhead cable. The two spherical segments are pivoted together at opposite ends and an opening is provided adjacent that pivoted connection, with the opening being filled with a resilient rubber material allowing the segments to clamp themselves to the line without cutting the line.

In Anderson et al, U.S. Pat. No. 4,474,133, a spherically shaped marker is hung by means of a clamp assembly, with the clamp itself being connected to the overhead cable.

In Osgood, U.S. Pat. No. 4,885,835, a spherical marker is disclosed that includes a peripheral flange. Half of the flange is bolted together and because the marker is made from a flexible material the other half of the radial flange can be flexed to an open position allowing the line to be slid through the opening. Bolts are then used to close the portion of the flange that had been opened. In order to hold the marker in place on the line, anchor wires extend from each end of the marker with these wires being twisted spirally around the line to thus hold the marker in position.

SUMMARY OF THE INVENTION

The present invention relates to an overhead line warning marker device that is easily installed or removed from one end thereof. A hinge structure is included at each end that includes a retaining assembly on the lower of two marker positions that permits rotation of the upper member relative to the lower member. When initially installed on one end of the lower member, the retaining assembly acts to pivotally receive an extension torque of the same end of the upper member. Following initial placement, the upper member can be rotated, in clamshell fashion, into a closed position. Then the near end hinge structure can be completed thereby fixing the upper member in position. Thereafter, removal of the upper member can occur from either end of the marker device. During installation, the far side hinge structure will have been preassembled so that no bolting or other securing effort is required on that end other than the insertion of the tongue extension into the hinge end and rotation to the closed position.

With the foregoing in mind, other objects, features and advantages of the present invention will become more apparent upon consideration of the following description and the appended claims with reference to the accompanying drawings, all of which form part of this specification, wherein like reference numerals designate corresponding parts in the various figures.

DETAILED DESCRIPTION OF THE PREFERRED EMBODIMENTS

Figure 1:
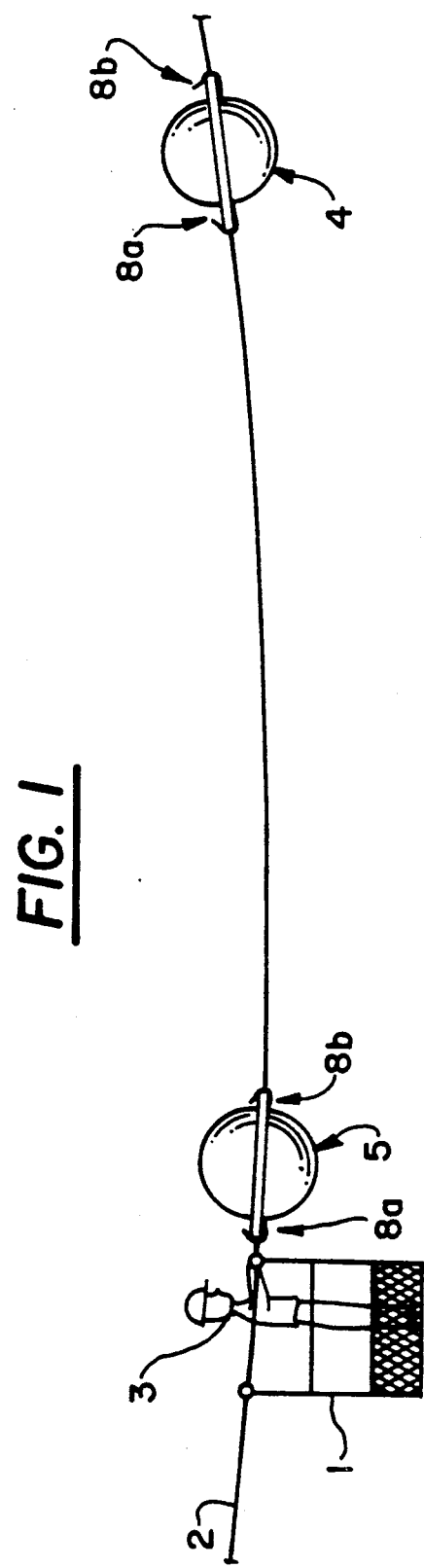
FIG. 1 diagrammatically depicts the installation of the marker according to the invention onto an overhead line.

FIG. 1 depicts the installation of markers constructed according to the present invention onto an overhead line by use of trolley buckets or helicopters. A trolley 1, which is movably suspended from overhead line 2, rolls along the overhead line. A person 3 can be transported in the trolley and move with it along the overhead line. Such a trolley can be used to install, remove, or maintain markers on an overhead line. FIG. 1 shows two markers, generally indicated at 4 and 5, installed on overhead line 2. To permit trolley 1 to move along line 2, installation of the markers would have begun with marker 4 onto the overhead line 2 at the location shown and to the right of the trolley. The trolley would then have moved along the line to the left away from installed marker 4 to the location where it is shown in FIG. 1. A second marker 5 was then installed behind trolley 1. This process continues until the desired number of markers are installed on the overhead line.

Each marker has two hinge assemblies, one at each side or end of the marker, to hold the marker onto the overhead line. Each hinge uniquely permits the marker portions to be assembled onto an overhead line from one side or end. Hinge assembly 8a is closest to the trolley 1. Hinge assembly 8b is farther from the trolley 1. Installation of hinges to both sides facilitates removal from either direction.

Figure 2:
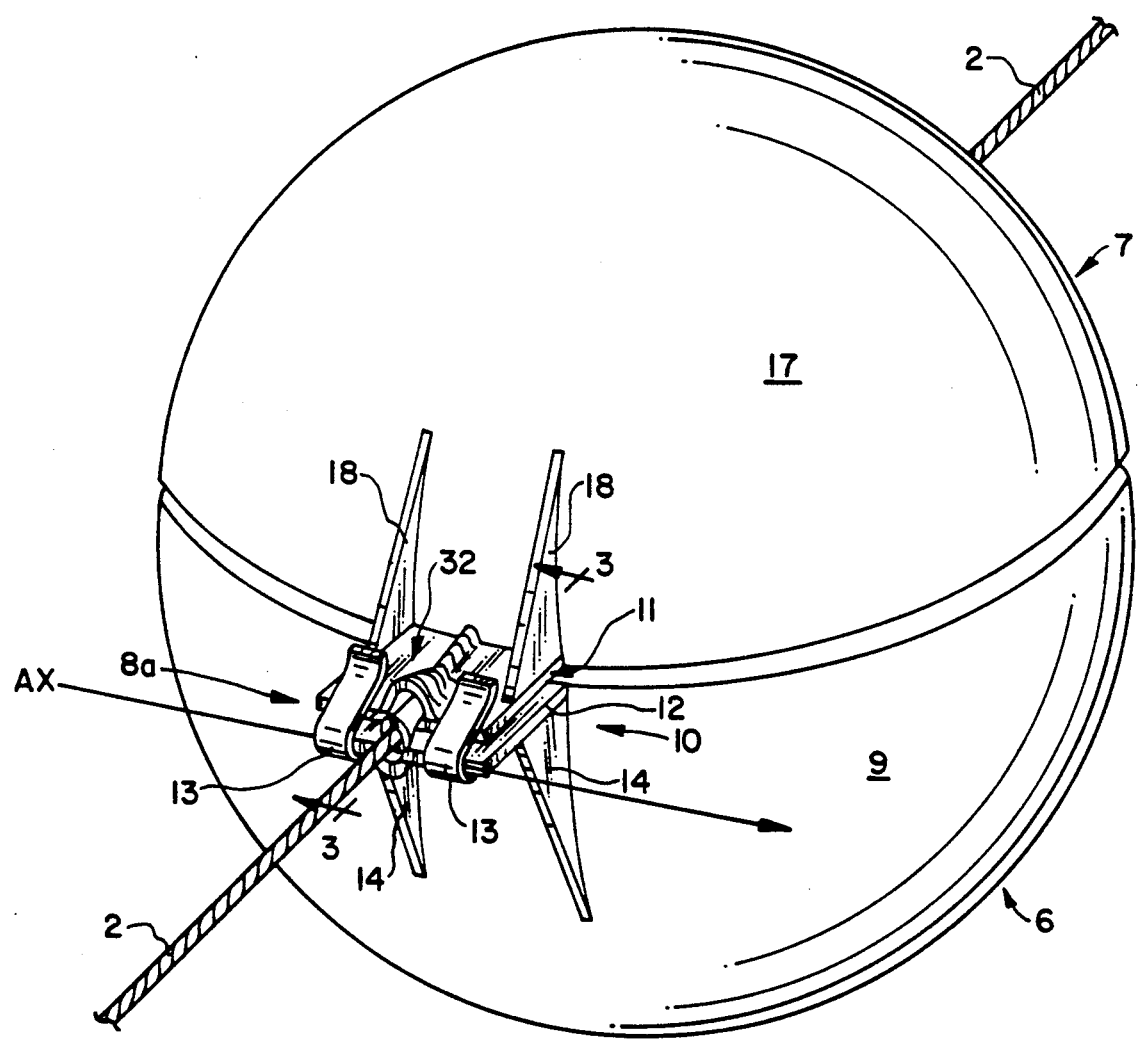
FIG. 2 is a perspective view of the marker of the present invention.

FIG. 2 is a perspective view of a marker of the present invention shown in the process of being installed onto overhead line 2. This embodiment of the marker comprises a hemisphere or lower member, generally shown at 6, and a second hemisphere or upper member, generally indicated at 7. The upper and lower members 6 and 7 are fastened together around overhead line 2 by two disengageable hinges, one at each end of the member. Only one of the disengageable hinges, hinge 8a, is shown in FIG. 2 because the other disengageable hinge 8b is hidden from view due to its location along the overhead line on the opposite side of the marker. Each hinge includes two portions, a catch extension portion 10, which is part of the first or bottom member 6 and a tongue extension portion 11 which is part of the second or upper member 7.

Figure 3:
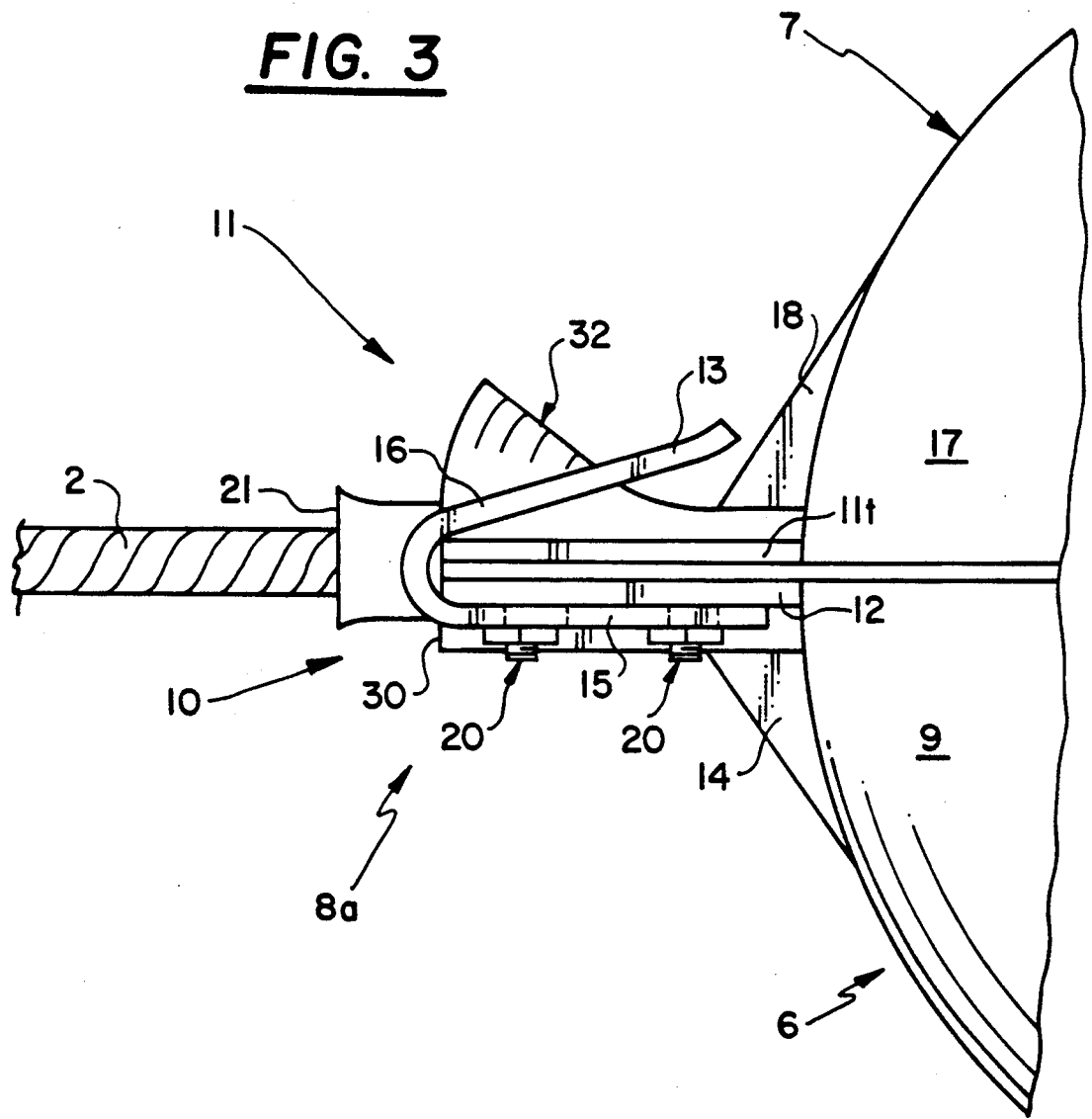
FIG. 3 is a view of the marker of FIG. 2 taken along line 3—3.
Figure 8:
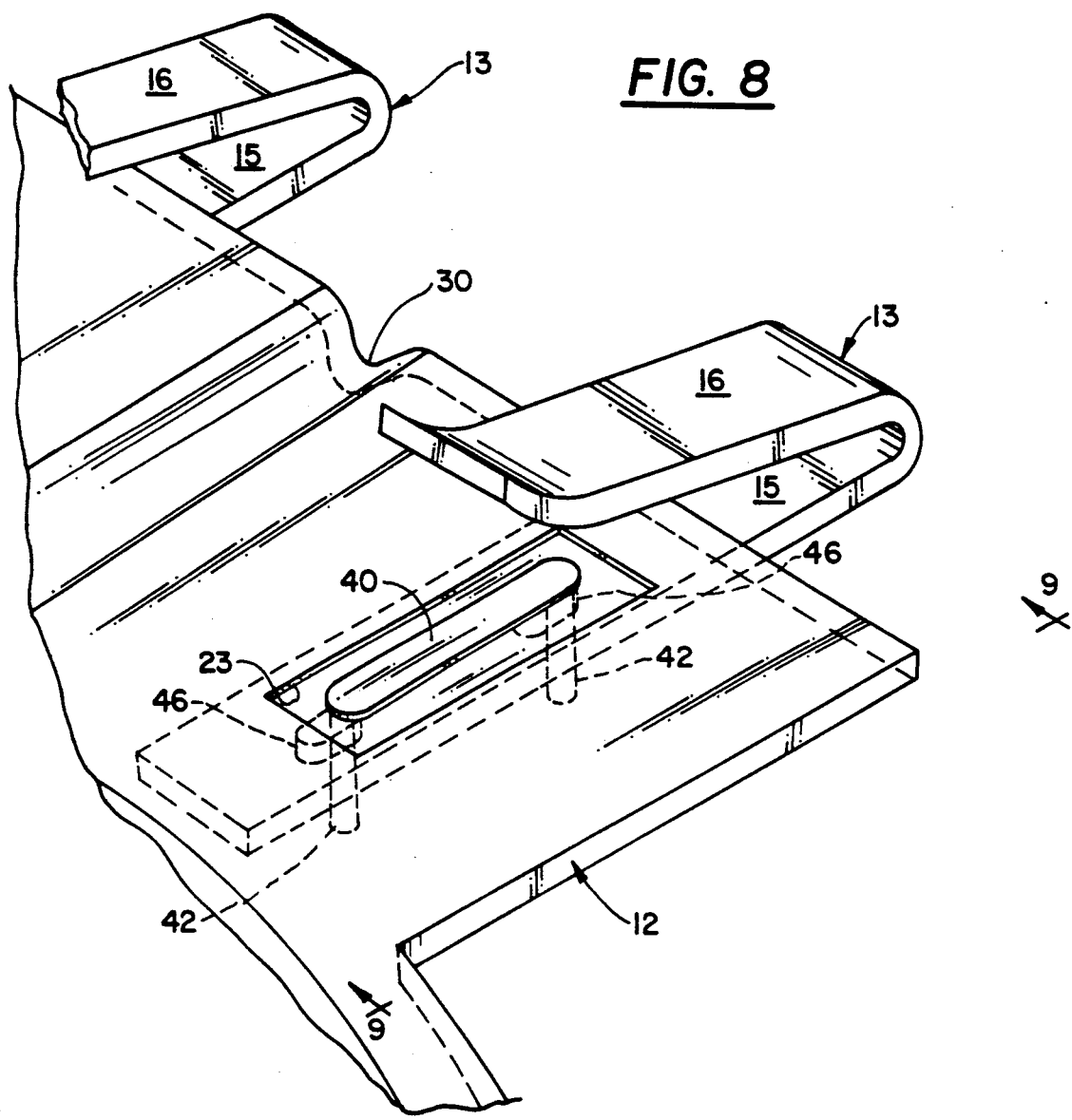
FIG. 8 is an enlarged detailed perspective view of the catch extension portion of the hinge structure.

The first or lower member 6 comprises a body portion 9, the catch extension portion 10 of hinge assembly 8a, and a catch extension portion of the opposite hidden end hinge assembly 8b. Each catch extension portion 10 extends radially outward from the body portion and in a direction radially away from the center of the marker. As shown in FIGS. 2, 3 and 8, the catch extension portion 10 of hinge assembly 8a actually comprises a plate portion 12, at least one, and preferable a pair of, U-shaped clasping finger 13, and one or more supporting buttresses 14. The supporting buttresses 14 are provided to secure the plate portion 12 rigidly and securely to the body portion 9.

As shown in the side view of FIG. 3, each U-shaped clasping finger 13 has two leg portions 15 and 16. One of the leg portions 15 is a longer leg and is fixed to plate portion 12, such as to the bottom surface, by any convenient means such as bolts 20. The other leg portion 16 is an upper leg and extends rearwardly in the general direction of the body portion 9. The closed portion of the generally U-shape is therefore positioned farthest from body 9 so that a body facing a retaining groove is formed. As shown in FIG. 2, this retaining groove has an axis AX which extends tangentially to the spherical body portion of the marker and generally intersects the overhead line. As noted above the retaining groove faces or opens generally toward body portion 9 as will be more fully discussed below.

The second or upper member 7 comprises a body portion 17, the tongue extension portion 11 of hinge 8a, and a tongue extension portion 11 of the opposite, hidden hinge 8b. The tongue extension portion 11 extends radially outward from the body portion 17 as did catch extension portion 10. Also, at least one and preferably two supporting buttresses 18 are provided to secure the tongue extension portion 11 rigidly and firmly to the body portion 17.

FIG. 3 shows tongue extension portion 11 clasped in catch extension portion 10 and specifically within the rearwardly facing retaining groove of the U-shaped finger 13. This serves to retain tongue 11 within fingers 13 and serves one end of the first and second members 6 and 7 together.

Two nuts 19 threaded onto threaded extensions 20 secure one leg 15 of U-shaped finger 13 to plate portion 12 of catch extension portion 10.

Most desirably, the hinge assemblies will snugly fit about line 2. To aid that result, plate portion 12 of the catch extension portion 10 is provided with a radially extending retaining trough 30. Trough 30 can either be formed into the top surface of plate 12 or simply preformed on stamped, as is shown in FIG. 8. Similarly, the tongue extension portion 11 is also provided with a radially extending trough 32. As shown in FIG. 3, the outboard end of trough 32 is upwardly flared. This allows the depth of trough 32 to become progressively deeper as trough 32 extends away from body portion 17.

When the first and second members 6 and 7 are installed onto overhead line 2, the retaining trough 30 and the flared trough 32 line up to form a passage which extends toward the center of the body portion of the marker. A bushing 21, which may be optional, is disposed around the overhead line 2, is held clasped in this trough passage of the closed marker.

Figure 4:
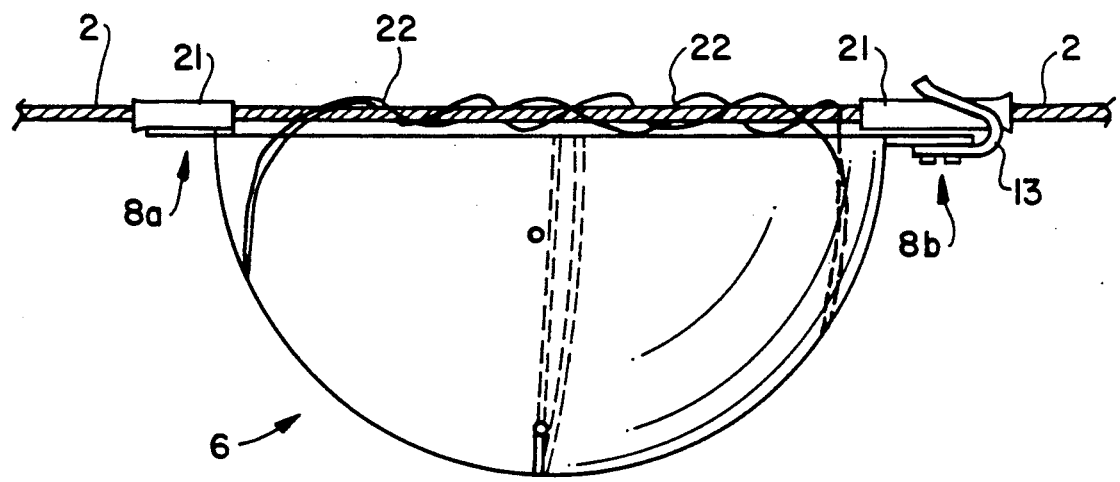
FIGS. 4 through 6 depict steps in the method of installing the marker according to the present invention.
Figure 5:
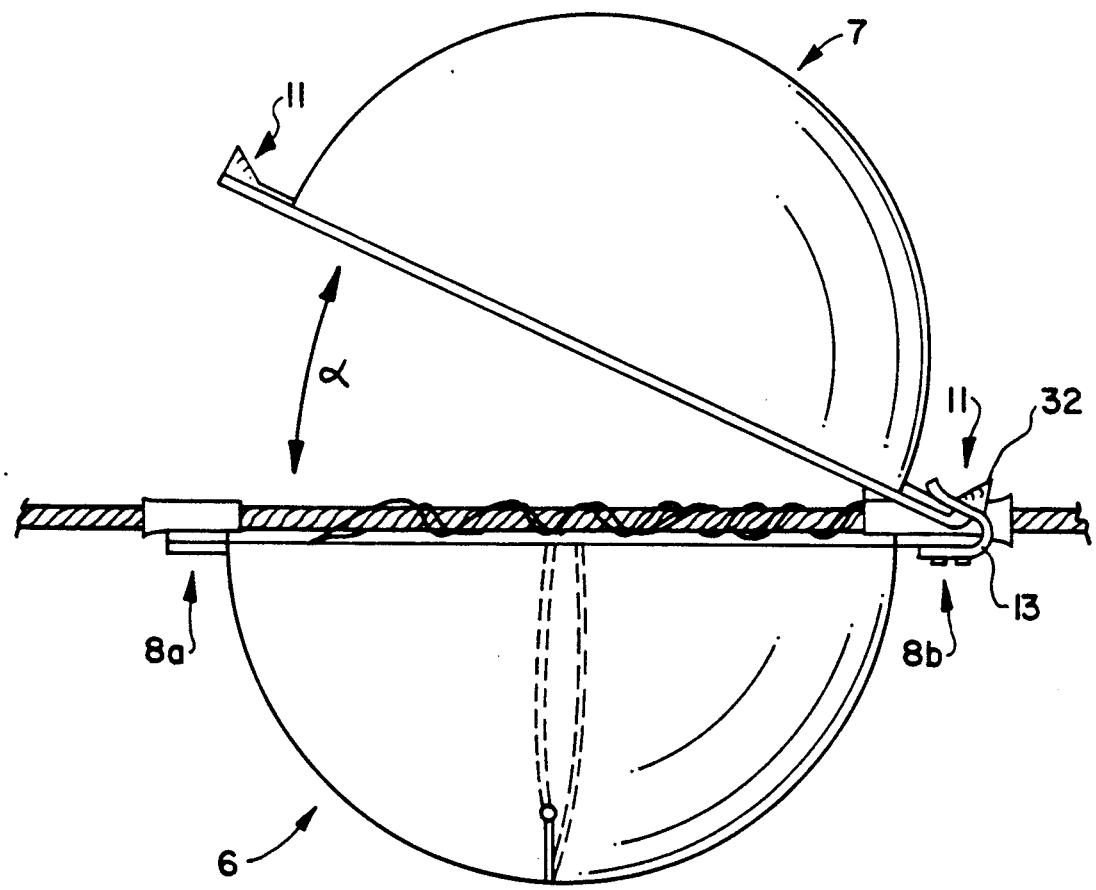
Figure 6:
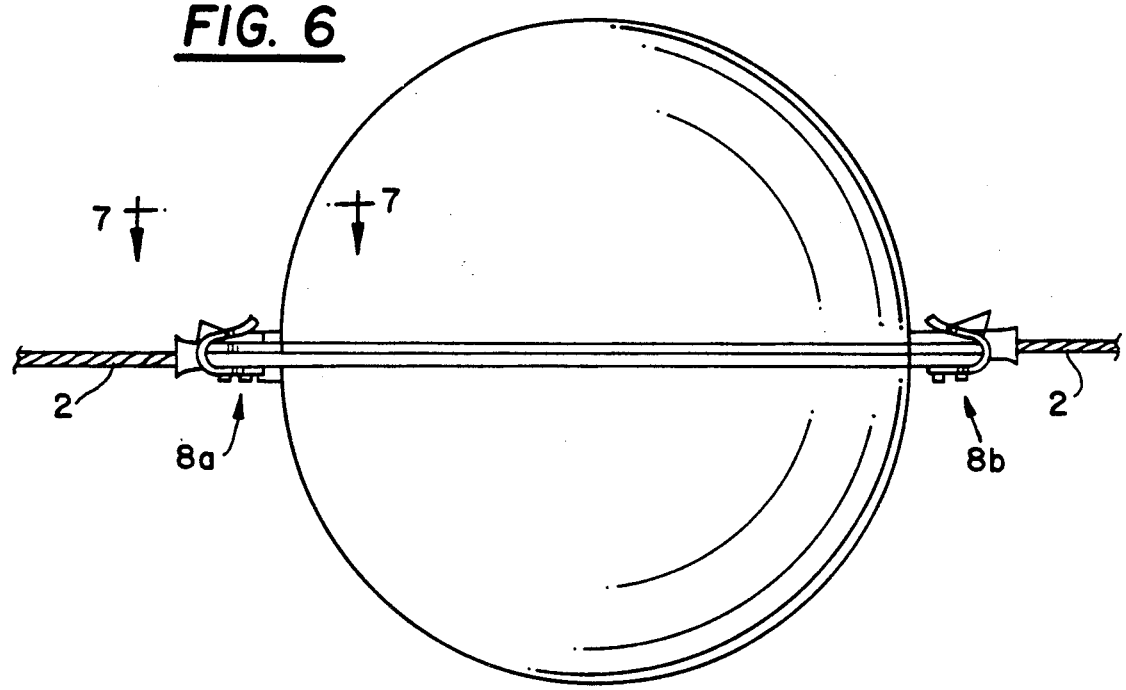

FIGS. 4 through 6 depict the steps practiced when installing the present marker onto an overhead line. First, only one of the two catch extensions 10 of the first member 6 is initially outfitted with one or more U-shaped finger 13. This will be the end that will be farthest away from the installer, and is assembly 8b in FIG. 4.

Then, as shown in FIG. 4, this first member 6 is attached to the overhead line 2 so that the catch extension portion of hinge assembly 8b, with the U-shaped finger 13, will be the far hinge assembly. Next, temporary wrapping straps 22, which are securely attached to the inside of the first or lower member, are pulled out from inside the first or lower member and wrapped around the overhead line. This supports the lower member 6 to the overhead line 2. Due to gravitational forces, the lower member 6 may naturally hang down from the supporting overhead line 2 but preferably line 2 is positioned close to trough 30 in each plate 12 at each end of member 6. Bushings 21 are then disposed around the overhead line 2. These bushings 21 are located along the overhead line 2 so that one bushing is disposed in each trough 30.

As shown in FIG. 5, the upper member 7 is located in position by moving it at an angle toward hinge assembly 8b. Tongue extension portion of hinge 8b of member 7 is then inserted at an angle, for example angle α, into the retaining groove of the catch extension portion 10 of hinge 8b of the lower member 6. The initial upward position assumed by member 7 at this juncture, when at angle α, as well as any upward rotation of member 7 during any subsequent process of removing the upper member 7 from its completed position on line 2 and on lower member 6, is facilitated due to the presence of trough 32. The flaring of trough 32 allows initial placement of member 7 accurately over bushing 21 and/or line 2. The flared end of trough 32 aids this initial positioning at angle α and allows rotation of upper member 7 without disturbing that locating effort. This flaring also allows member 7, particularly tongue extension 11, to be slid along the overhead line 2 at angle α to thereby guide tongue extension portion 11 into a centered position in the retaining groove of hinge 8b of the lower member.

When the tongue extension 11 is so clasped in the retaining groove, hinge 8b is said to be "engaged". The upper member 7 can then be clamshell pivoted downwardly about the hinge axis AX of hinge 8b so that the first and second members come together and form a completed geometrical body portion, such as, for example a sphere, of the closed marker. The motion of clamshell pivoting is also depicted in FIG. 5 by arc arrow defining angle 6 and 7 α.

After the first and second members are closed about the hinge axis AX of hinge 8b, the first and second members are joined together to keep them from reopening. In the preferred embodiment, this joining is accomplished utilizing the other hinge 8a. After pivoting, the plate portion of the catch extension portion 10 of hinge 8a meets and overlies a portion of the tongue extension portion 11 of hinge 8a. Then, one or more U-shaped fingers 13 is installed with leg portion 15 being secured to plate portion 12 of catch extension 10 by bolts so that leg portion 16 lies positioned over the tongue extension portion 11. This U-shaped member may be securely fixed to the plate portion 12 of the catch extension portion 10 of the hinge 8a by any convenient means that allows for the subsequent removal of the upper member 7 from lower member 6. It should also be noted that the angle between leg portions 15 and 16 is such that the U-shaped design will grip both members 11 and 12. Installation is then complete. Hinges 8a and 8b hold hemisphere members 6 and 7 together and on overhead line 2.

Figure 7:
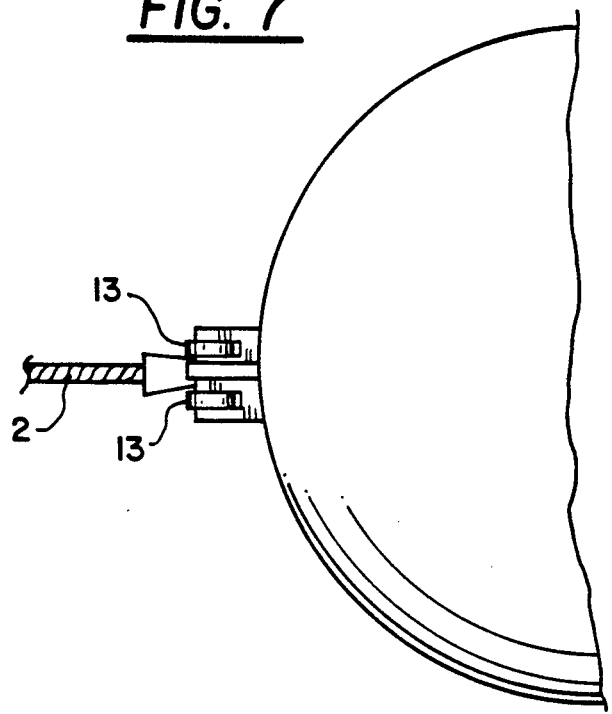
FIG. 7 is a top plan view of one end of the installed marker of FIG. 6 taken along line 7—7.

FIG. 7 shows that in the preferred embodiment of the present invention two U-shaped fingers 13 are used on the plate portion of each hinge, one on either side of overhead line 2. Alternatively, one such finger 13 could be used, one finger structure could include a pair of spaced apart leg portions 16 integrally formed on a single lower leg or more than two fingers 13 could be employed.

Figure 9:
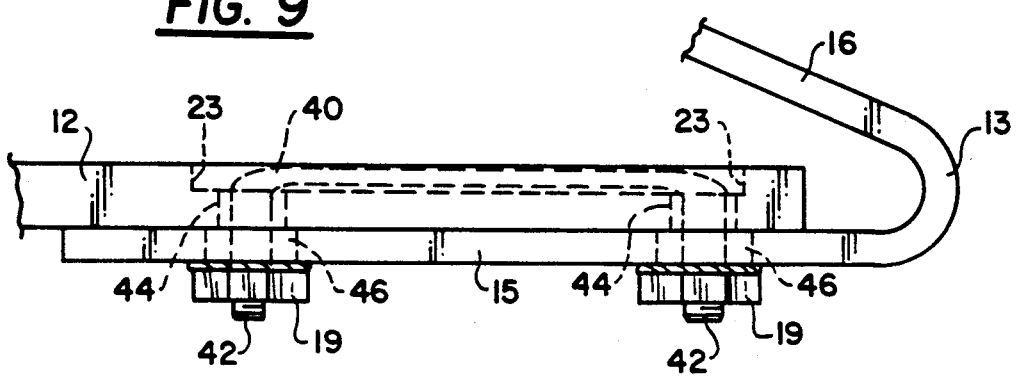
FIG. 9 is a closeup and detailed view of the extension portion of FIG. 8 taken along line 9—9' thereof.

FIGS. 8 and 9 provide a closeup and detailed view of the catch extension portion 10 of the marker. As an alternative to bolts 20 shown in FIG. 3, a single bolt member 40 with two threaded extensions 42 is positioned in a countersunk recess 23 formed in the top surface of plate portion 12. The threaded extensions 42 extend downwardly through holes 44 in plate portion 12 and also through elongated holes or slots 46 located in the U-shaped finger member 13. Holes 46 each have an oblong or elongated shape to allow the U-shaped finger to slide in the direction of the overhead line so that the U-shaped finger members can be fastened to the first member at slightly different locations and to facilitate installation and removal of member 13 with the two halves closed.

While the invention has been described in connection with what is presently considered to be the most practical and preferred embodiment, it is to be understood that the invention is not limited to the enclosed embodiment but, on the contrary, is intended to cover various modifications included within the spirit and scope of the appended claims.

For example, the hinge member of the present invention need not necessarily be readily disengageable in all embodiments. Furthermore, the hinge member also need not have any specific construction. What is described above is but one embodiment of the hinge. The hinge of this invention may, for example, be located on a peripheral surface of the sphere at a location away from the power line so that the axis of the retaining groove is parallel to the overhead line upon which the marker is installed.

Additionally, the use of the term clamshell pivoting in the above description is to be understood to describe the opening and/or closing of two shell portions of a substantially hollow body of the marker so that the pivoting occurs about a hinge axis which is located substantially on or near a peripheral exterior surface of the closed body. In embodiments such the preferred embodiment shown in the figures, the hinge axis may actually be located outward and away from the exterior surface of the closed body portion of the marker. In the event that the shell portions are not hemispheres but other geometrical or angular shapes, the hinge axis for clamshell pivoting may, for example, run along one sidewall or a peripheral surface of an angular body member.

Lastly, the body portion of the marker described above may have any number of shapes other than the spherical shape shown in the Figures. Among possible shapes for the body portion are oblong shapes, egg shapes, a cubical shape, diamond shapes, a tetrahedral shape, et cetera. Accordingly, the use of the term body member throughout this description is intended to describe one of two shell portions of a substantially hollow body which close to form a body portion of any suitable shape. The two body members may, but need not be, of substantially the same size.

I claim:

1. An aerial marker for attachment to a suspended line, comprising a first shell member and a second shell member, said first and second shell members being joinable to each other by a hinge, said hinge having a hinge axis about which clamshell pivoting of the first shell member with respect to the second shell member can occur, said first and second shell members being closable about said line by clamshell pivoting about said hinge axis, said first and second shell members forming a closed aerial marker structure when the first and second shell members are closed, said closed aerial marker structure comprising a body portion and said hinge, said hinge extending from said body portion so that said hinge axis does not intersect said body portion.

2. The aerial marker of claim 1, wherein said hinge is disengageable, said clamshell pivoting of said first and second shell members about said hinge axis being possible when said hinge is engaged, said first and second shell members being separable when said hinge is disengaged.

3. The aerial marker of claim 1, wherein said hinge axis is substantially perpendicular to said line when said first and second shell members are closed about said line.

4. The aerial marker of claim 1, wherein said hinge comprises a catch extension which is a part of said first shell member and a tongue extension which is a part of said second shell member, said catch extension extending outward from a hemispherical body portion of the first shell member to form a pivoting groove which substantially faces toward the hemispherical body portion of the first shell member, the pivoting groove having an axis which is said hinge axis, said hinge axis being tangential to said hemispherical body portion of the first shell member, said tongue extension extending outward from a hemispherical body portion of the second shell member, said tongue extension being removably insertable into the pivoting groove so that the tongue is clasped in the pivoting groove, the second shell member being clamshell pivotable about the hinge axis with respect to the first shell member when the tongue is clamped in the pivoting groove.

5. The aerial marker of claim 4, wherein said catch extension forms a retaining through for retaining said line, said retaining trough having an axis which is substantially perpendicular to said hinge axis.

6. The aerial marker of claim 5, wherein said tongue extension also forms a trough, said retaining trough of said first shell member and said trough of said second shell member coming together to form a passage into a spherical body portion formed when the first and second shell members are closed.

7. The aerial marker of claim 6, wherein said trough of the tongue extension is flared, the trough having an ever increasing depth as the trough extends outward and away from the hemispherical body portion of the second shell member.

8. The aerial marker of claim 7, wherein said catch extension comprises a plate portion and at least one U-shaped portion, said plate portion extending from the hemispherical body portion of the first shell member, said plate portion forming said retaining trough, said U-shaped portion being fixed to said plate portion so that the U-shaped portion forms the pivoting groove.

9. The aerial marker of claim 8, further comprising an optional bushing having a substantially tubular shape, said optional bushing being claspable in said passage between said first and second shell members when the first and second shell members are closed.

10. The aerial marker of claims 1, 3 or 9, further comprising clasping mean for holding the first and second shell members closed, said clasping means holding said first shell member at a location on said first shell member opposite hinge, said clasping means holding said second shell member at a location on said second shell member opposite said hinge.

11. The aerial marker of claim 10, wherein said clasping means is a second hinge having the same construction as said hinge.

12. A method of installing an aerial marker on a suspended line, said aerial marker comprising a first hemispherical shell member with a center and a second hemispherical shell member with a center, a first part of said disengageable hinge attached to said first hemispherical shell, a second part of said disengageable hinge attached to a said second hemispherical shell, the method comprising the steps of:
(a) attaching said first shell member onto a line so that said center of the first shell member is intersected by the line;
(b) attaching said second shell member to the first shell member by engaging said second part of the disengageable hinge with said first part of the disengageable hinge; and
(c) clamshell pivoting said second shell member with respect to said first shell member about said hinge so that said first and second shell members close to form a spherical marker surface about said line.

13. The method of claim 12, further comprising the step of:
(d) fixing the first and second shell members together at a fixing location, said fixing location being located on a portion of the spherical marker surface opposite said hinge.

14. The method of claim 13, wherein said attaching steps are performed from a trolley suspended from or helicopter hovering beside said line, said first and second shell members being attached onto the line so that during said fixing step (d) said fixing location is disposed along said line between said trolley and said hinge.

15. A marker sphere for use on a suspended overhead line, comprising:
a first hemisphere having a hemispherical surface with respect to a center point of the first hemisphere, the first hemisphere having a catch extension which extends outward from the hemispherical surface away from the center point of the first hemisphere, the catch extension forming a groove which substantially faces toward the center of the first hemisphere, the groove having a groove axis; and
a second hemisphere having a hemispherical surface with respect to a center point of the second hemisphere, the second hemisphere having a tongue extension which extends outward from the hemispherical surface away from the center point of the second hemisphere, the tongue extension being removably insertable into the groove of the first hemisphere so that the tongue is clasped in the groove, the second hemisphere being pivotable over an angle about the groove axis when the tongue is clasped in the groove, the first and the second hemispheres being closable when the tongue is clasped in the groove so that the first and second hemispheres comes together to form a sphere, each said catch extension and said tongue extension including retaining surfaces, said surfaces aligning when said first and second hemispheres come together to form said sphere so that the sphere may be secured to the overhead line.

* * * * *